J. McMurtry
Elevator.
N° 27,760.  Patented Apr. 3, 1860.
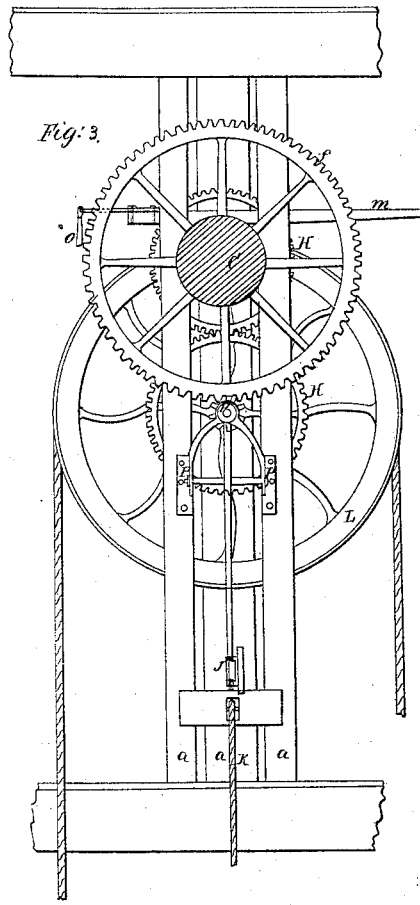
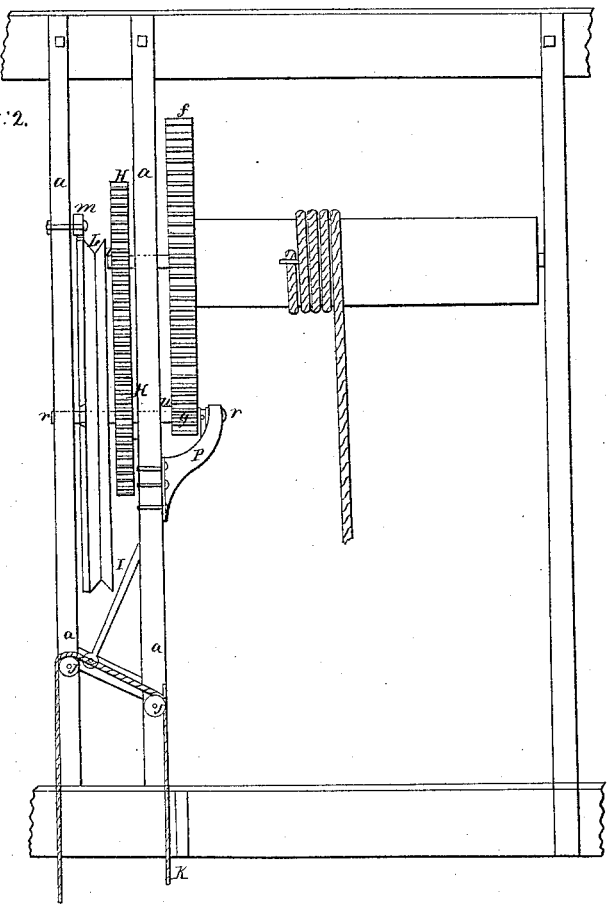
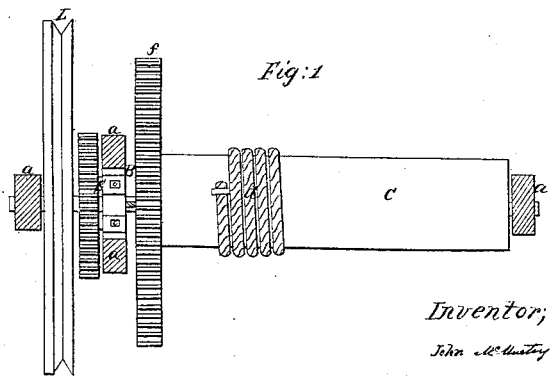
Witnesses:  Inventor;
  John McMurtry

UNITED STATES PATENT OFFICE.

JOHN McMURTRY, OF FAYETTE COUNTY, KENTUCKY, ASSIGNOR TO G. B. KINKEAD, OF LEXINGTON, KENTUCKY.

OPERATING HOISTING-WHEELS.

Specification of Letters Patent No. 27,760, dated April 3, 1860.

*To all whom it may concern:*

Be it known that I, JOHN McMURTRY, of the county of Fayette and State of Kentucky, have invented a new and useful Improvement in Hoisting-Wheels; and I do hereby declare that the following is a full, clear, and exact description of the construction and operation of same, reference being had to the annexed drawings, making a part of this specification, in which—

Figure 1 represents a top view. Fig. 2 represents a side elevation. Fig. 3 represents an elevation of the end view, next the shivewheel, and gearing.

Letters in the different figures refer to like parts.

To enable others skilled in the art to make and use my invention, I will proceed to describe its construction and operation.

See Fig. 2: I make the roller shaft $c$, the pinion $g$, the spurwheel $f$, and the shivewheel L the same as in ordinary hoisting wheels, excepting that the spurwheel $f$ has the ends of its cogs, on the side next to the shive wheel, brought to an edge in their centers, and the pinion $g$ has both ends of its cogs pointed in the same manner. This pinion $g$ slides on a feather key, inserted into its shaft R.

The shaft, R, is made sufficiently long, so as to receive the spurwheel, H, freely, between the shivewheel, L, and the spurwheel, $f$, on the roller shaft, C. This spurwheel, H, has on its side, next to the pinion, $g$, an internal gear, with the ends of its cogs pointed, the same as those above described. This internal gear is fitted, so as to receive freely the pinion, $g$, when desired. The feather key, on which the pinion, $g$, slides, passes along the shaft, R, to a collar that is at the rear part of the internal gear, and resting against the hub of the spurwheel, H, for the purpose of keeping said spurwheel in position, and preventing the feather key from causing friction against the hub of spurwheel, H. It being remembered that the spurwheel, H, is loose on its shaft, R, so as to accommodate itself to the change of motion between it and the pinion, $g$, when in gear with $f$.

There is an indent, or recess, in the end of the pinion $g$ that receives the collar above described, enabling the pinion, $g$, to pass full into the internal gear of H. The pinion, $g$, has on its opposite end, a hub in which there is a groove for the purpose of inserting pins or swivel pieces attached to the jaws of the lever, I, for the purpose of shifting the pinion, $g$, from the internal gear of the spurwheel, H, into gear with the large spurwheel, $f$, on the roller shaft, C, or vice versa. The axle of the roller shaft, C, passing through the spurwheel, $f$, is extended so as to receive the spurwheel, H, on its end (keyed fast.) These spurwheels, H, H, I have made of equal size, but they may be varied at pleasure, but must be in all cases the same distance from their centers, as the distance is from the large spurwheel, $f$, and the pinion, $g$, are from centers. The lever, $m$, is a brake for the shivewheel, L, the same as commonly used.

The operation of my improved hoisting wheel is as follows: A very large proportion of the time hoisting wheels are used for hoisting light articles, when a fast motion is desired, to economize time, and when it is desired to raise heavy weights, it is only necessary in my improved wheel to pull the left hand cord, $k$, as seen in Fig. 2, (which is attached to the lever, I, as shown), and you bring the pinion, $g$, into gear with the large spurwheel, $f$, which enables you to raise the heavy weights without increasing the number of hands. When it is desired to change the motion back to the fast motion, it is only necessary to pull the cord, $k$, (on the right) which being also attached to the lever, I, (as shown in Fig. 2,) will shift the pinion, $g$, back into the internal gear of the spurwheel, H, which will cause it to operate the spurwheel, H, that is on the end of the shaft of the roller, $c$, and will move the same in (I term the fast motion.) I also, when desired, increase the length of the shivewheel shaft, R, so as to give room on same, for the pinion, $g$, to rest in between the spurwheel, $f$, and the internal gear of the spurwheel, H, and I attach a rim on the side of the spurwheel, H, that is on the shaft of the roller, $c$. This rim is for receiving the pressure of the common brake, $m$, extended in thickness so as to brake on same, simultaneously wit its action on the shivewheel, L. By this arrangement the pinion, $g$, at pleasure, may be shifted between the spurwheel, $f$, and the internal gear of spurwheel, H, so as to permit the weight of the hook rope, $d$, to turn the roller shaft, $c$, with great rapidity, without moving the full rope that is on the shivewheel, L, and when the hook-rope, d, has descended to the point desired, the pulling of the rope of the brake, m, will press on the rim of the spurwheel, H, (above described) and cause the roller, c, to stop, when by means of the cords, k, k, the pinion, g, can be shifted in gear with the fast, or slow motion as may be desired.

What I claim as my invention, and desire to secure by Letters Patent is—

The removing the pinion, g, entirely out of gear with the spurwheel, f, on the roller shaft, so as to permit the spurwheel, f, to turn freely, and at the same time at will, either to let the pinion, g, rest between the gearing of the fast and slow motion, or cause it to pass immediately, in, gear with the fast, or return it to the slow motion, substantially as described, and for the purposes set forth.

JOHN McMURTRY.

Attested by—
  Z. GIBBONS,
  ALEX. MOORE.